United States Patent [19]

Nelson

[11] Patent Number: 4,911,202
[45] Date of Patent: Mar. 27, 1990

[54] VALVE CONSTRUCTION

[75] Inventor: Donald R. Nelson, Worcester, Mass.

[73] Assignee: Goddard Industries, Inc., Worcester, Mass.

[21] Appl. No.: 167,735

[22] Filed: Mar. 14, 1988

[51] Int. Cl.⁴ .............................................. F16K 41/04
[52] U.S. Cl. .................................... 137/595; 251/309; 251/900; 277/112
[58] Field of Search ............... 137/595, 594, 606, 607, 137/637, 637.3; 277/112, 102, 107

[56] References Cited

U.S. PATENT DOCUMENTS

| 2,075,740 | 3/1937 | McKay | 137/637 |
| 2,643,675 | 6/1953 | Symmons | 137/595 X |
| 3,091,471 | 5/1963 | Lawless et al. | 277/112 |
| 3,234,958 | 2/1966 | Butters | 137/595 X |
| 3,443,816 | 5/1969 | Saleri et al. | 277/112 |
| 4,558,874 | 12/1985 | Williams et al. | 277/112 |
| 4,611,626 | 9/1986 | Logsdon | 137/595 X |

Primary Examiner—Stephen M. Hepperle
Attorney, Agent, or Firm—Wolf, Greenfield & Sacks

[57] ABSTRACT

A hot and cold water control valve having a body for supporting first and second liquid conduits having respective first and second valve closure members. Each of the valve closure members has an actuating member controlled by a handle that is secured to and for operation of the actuating member of the first and second valve closure members. The handle is adapted to be moved between open and closed positions.

3 Claims, 2 Drawing Sheets

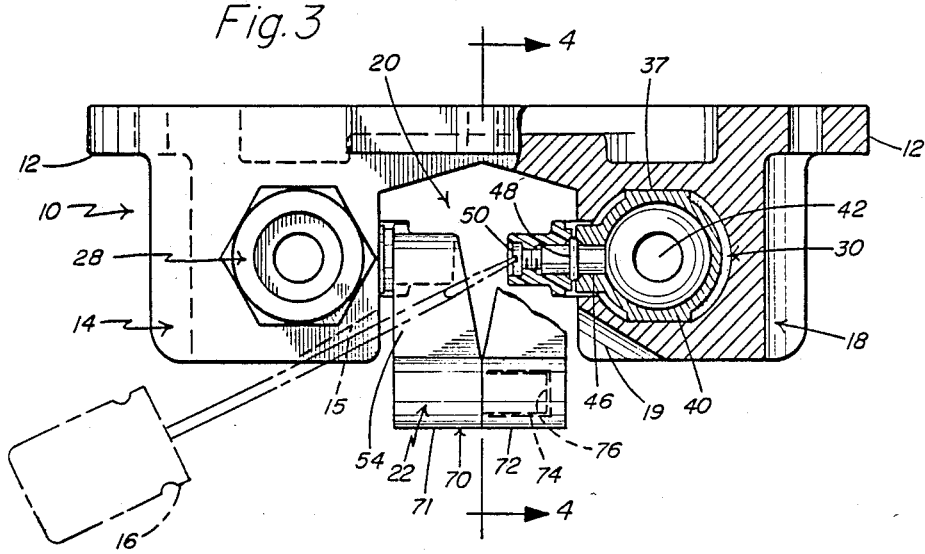
Fig. 3
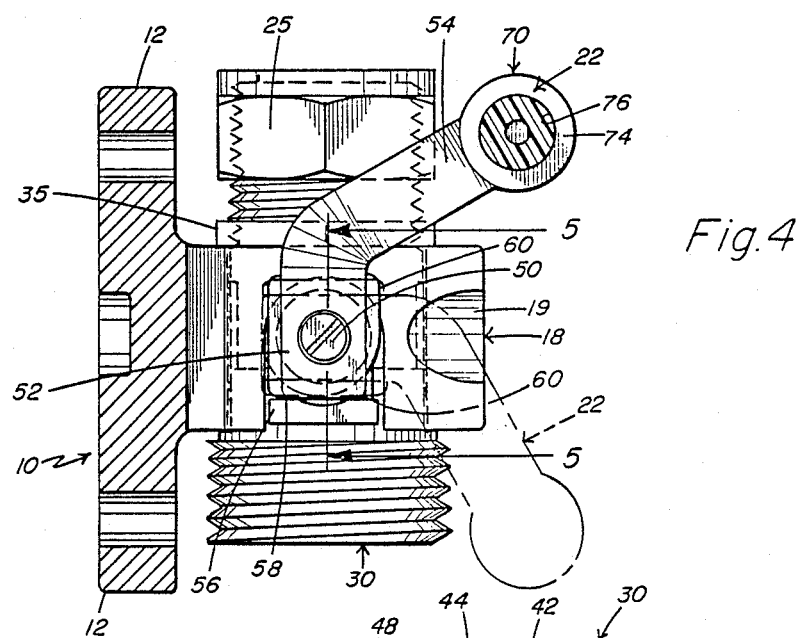
Fig. 4
Fig. 5

VALVE CONSTRUCTION

BACKGROUND OF THE INVENTION

1. Field of the Invention

The present invention relates in general to a valve construction and pertains more particularly, to a dual valve construction that may be used for controlling hot and cold water flow. Even more particularly, the present invention pertains preferably to a valve used in controlling hot and cold water flow to an appliance such as a washing machine.

2. Objectives of the Invention

It is an object of the present invention to provide an improved valve construction and in particular one that is of relatively simple construction, having few component parts and which can be readily assembled and disassembled.

Another object of the present invention is to provide an improved valve construction that may be particularly adapted for the control of hot and cold water such as in controlling water flow to an appliance such as a washing machine.

A further object of the present invention is to provide an improved valve construction for controlling hot and cold water flow and in which the valve operating mechanism may be constructed to provide for either common valve control or separate control.

Still another object of the present invention is to provide an improved valve construction for dual water flow and in which ready access is provided to packing means associated with the valve.

Still a further object of the present invention is to provide an improved valve construction in which the valve actuating handle may be moved between alternate open and closed positions and in which the actuating handle is preferably accomodated in a gap or opening in the valve body.

SUMMARY OF THE INVENTION

To accomplish the foregoing and other objects, features and advantages of the invention there is provided a valve that is comprised of a body having first and second support members separated by a gap. A first and second liquid conduit means are supported respectively in these first and second support members. A first and second valve closure means each having open and close positions are supported respectively in the first and second liquid conduit means. The first and second valve closure means each have actuating means directed in facing respective relationship. Handle means are provided secured to and for operation of the actuating means of the first and second valve closure means. The handle means is adapted to move partially through the gap between open and closed positions of the valve closure means. The handle means preferably comprises a common handle having separate control arms for securing to the respective actuating means. The common handle has a base end supporting the control arms and includes an interlocking member. The interlocking member includes separable pieces that may be interlocked to enable the handle means to operate the valve closure members in unison. Alternatively, the interlocking member may be separated to enable separate control of each control arm. The interlocking members in the disclosed embodiment include a post and recessed construction. The post may be severed to enable the separate control of the valve closure members. The actuating means may include packing means and means for adjusting the packing means. In this regard the support member also preferably includes recessed means to enable access to the means for adjusting. The packing means may include an O-ring while the means for adjusting may include a screw that may be tightened to compress the O-ring. The valve closure means themselves may include a ball-valve. The valve actuating means may comprise a valve stem with the valve stems of the respective closure members being in linear alignment.

BRIEF DESCRIPTION OF THE DRAWINGS

Numerous other objects, features and advantages of the invention should now become apparent upon a reading of the following detailed description taken in conjunction with the accompanying drawings, in which:

FIG. 3 is a top planned view partially cut away illustrating the valve construction of FIGS. 1 and 2;

FIG. 4 is a cross-sectional view taken along line 4—4 of FIG. 3 illustrating the operating handle in solid in its "on" position and in phantom in its "off" position; and FIG. 5 is a further detailed view taken along line 5—5 of FIG. 4 showing the valve construction and associated packing.

DETAILED DESCRIPTION OF THE DRAWINGS

Reference is now made to the drawings and in particular the FIGS. 1-5 for a detailed explanation of a preferred embodiment of the present invention. The valve construction described herein may be used as a control valve for controlling hot and cold water flow to an appliance such as a washing machine. As such, there are actually a pair of valves that are controlled preferrably by a common handle. However, in accordance with the invention the handle construction is formed so that it can be readily separated, preferably by severing, so that each of the valves can also be operated independently.

Figure 1:
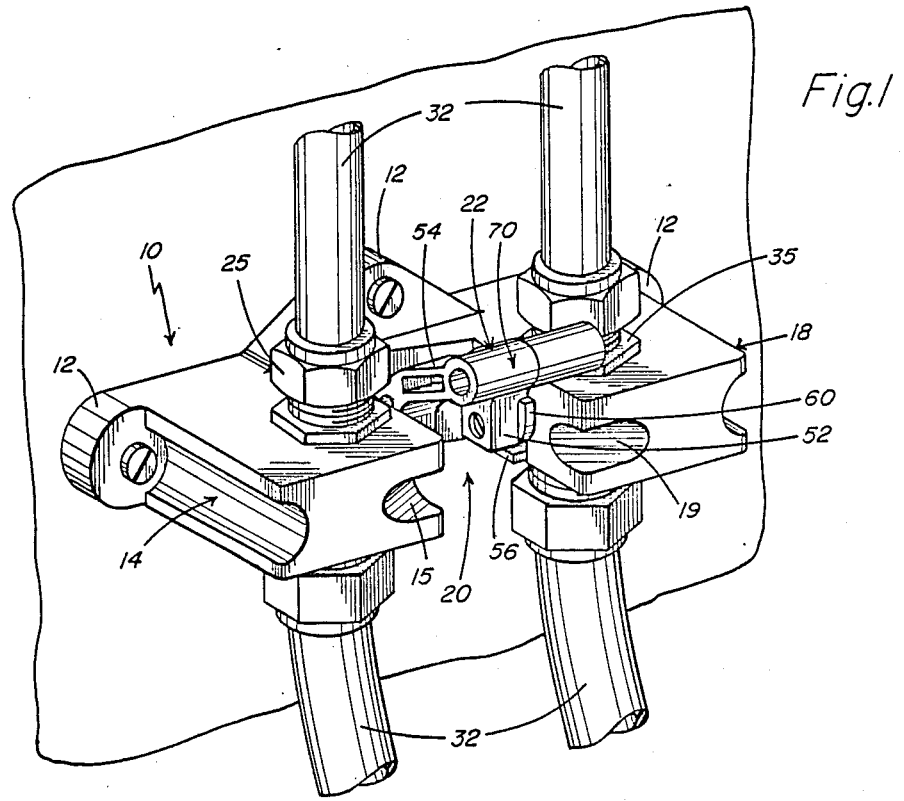
FIG. 1 is a perspective view of a preferred embodiment of the valve construction of the present invention with the valve illustrated in its "on" position.
Figure 2:
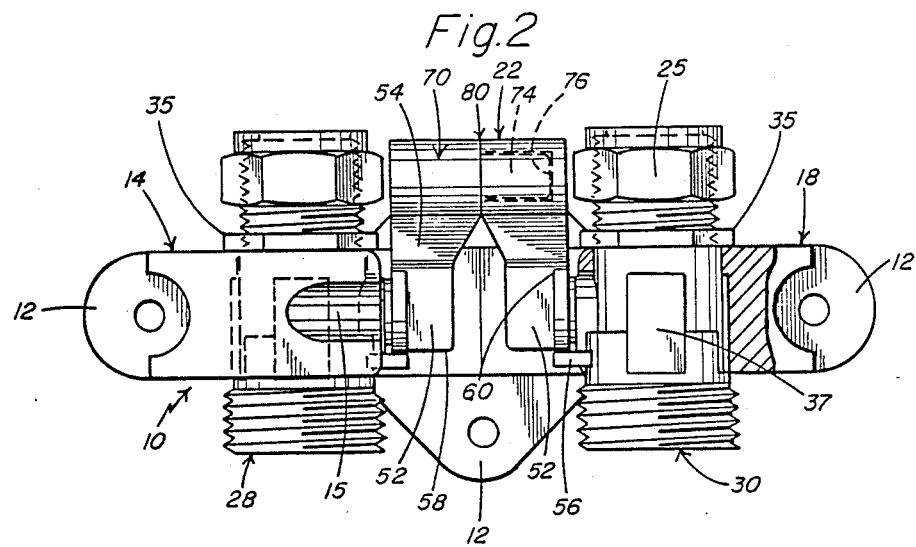
FIG. 2 is a front elevation view of the valve construction of FIG. 1 with the valve again in its "on" position.

The valve illustrated in the drawings comprises a body 10 having a plurality of securing flanges 12 such as is illustrated in FIGS. 1 and 2. The body of the valve may be constructed of a hard plastic material and includes separated valve support members 14 and 18 as illustrated in FIG. 1, the members 14 and 18 have respective slots 15 and 19 that may accomodate a screwdriver or the like. In this regard refer to FIG. 3 in which there is shown in phantom a screwdriver at 16 extending through the slot 15 to provide access to one of the packing screws, the details of which are described hereinafter.

As noted in FIGS. 1 and 3, the support members 14 and 18 are separated from each other and thus define therebetween a recess or gap 20 of a sufficient width to readily accomodate the handle 22. FIGS. 2 and 3 in particular, illustrate the dimensional inter-relationship between the handle 22 and the gap or recess 22 between the support members 14 and 18. The details of the construction of the handle 22 are discussed hereinafter.

The support members 14 and 18 accomodate respective water-fittings 28 and 30. These water-fittings may be of metal construction having opposite threaded ends as illustrated. A conventional securing nut arrangement such as illustrated at 25 in FIG. 1 may be employed in connecting the water-fittings to the hoses. In this connection note the hoses 32 in FIG. 1. The water-fittings 28 and 30 are for the coupling of separate hot and cold water. The water-fittings 28 and 30 are secured in place in the respective support members 14 and 18 by the securing nut 35. Also note the securing nut in cross-sectional view in FIG. 5.

Each of the water-fittings 28 and 30 are of substantially identical construction having means, illustrated in cross-sectional detail in FIG. 5, for receiving a valve closure member. In this regard refer to FIG. 5 to the ball-valve 40 that is arranged in FIG. 5 with its through passage 42 in its "open" position. The ball-valve 40 is disposed in a somewhat resilient rubber seat 44 and is provided with a valve stem 46.

The external surface of each of the closure members is provided with a flat such as illustrate in FIG. 2 at 37. The flat prevents rotation of the water-fitting within the body of the valve. In this regard also refer to the flat 37 illustrated in FIG. 3.

The valve stem 46 is provided with a recess for accomodating a sealing O-ring 48. This O-ring 48 is illustrated in FIG. 3 as well as in the cross-sectional view of FIG. 5. The valve stem 46 is also provided with an internally threaded hole for receiving the valve packing adjustment screw 50. The valve packing is provided by the O-ring 48 and the screw 50 may be turned to compress the O-ring 48 to provide a watertight joint.

FIG. 5 is a cross-sectional view showing the details of the valve closure member and the adjusting screw 50. Reference has been made hereinbefore to FIG. 3 for an illustration of access by a screwdriver or the like provided to the screw 50. To tighten up on the packing or the O-ring, the screw 50 may be turned inwardly. The screw 50, passing through the base 52 of one of the control arms 54 of the handle 22, tightens the base 52 against the O-ring, and essentially sandwiching the O-ring between the base 52 and the water-fitting. This is clearly illustrated in FIG. 5.

It is noted that although the screw 50 may be tightened to compress the O-ring 48, the valve stem 46 itself is interlocked with the base 52 of the handle 22 so that upon any movement of the handle 22 the valve stem 46 will rotate therewith. In this connection the stem 46 may have a flat thereon outside of the O-ring so that it is properly interlocked with the handle. The handle, of course, is not meant to rotate relative to the valve stem.

The external surface of the water-fitting is also provided with a stop-ledge 56. This provides a stop surface for the two extreme positions of the handle 22. These two extreme positions are illustrated in FIG. 4. in the open view of the valve as illustrated in solid outline in FIG. 4, The very bottom surface at 58 of the handle engages against the stop-ledge 56. This is essentially an upper rotated limiting position of the handle as illustrated in solid outline in FIG. 4.

The opposite position of the handle is shown in phantom in FIG. 4 and in this regard the handle base is provided with a ridge 60 such as is illustrated in FIG. 4 that comes into contact with the stop-ledge 56 in the downward limited position of the handle 22. In the downward position of the handle 22 illustrated in FIG. 4 in phantom, the ball valve 40 has rotated through 90° and thus the passage 42 is in its blocked position with the valve essentially in its "closed" position.

The handle 22 is essentially formed by the separate bases 52 and integral control arms 54 are terminated at the opposite end by an interlocking member 70 that essentially provides for an interlock between the ends of the control arms 54. In this regard there is provided two sections 71 and 72. The section 71 is provide with an extending post 74 that fits into an accomodating hole 76 in the member 72. This interlocking means that both of the control arms move in unison upon any manual gripping of the handle at the interlock member 70.

The control arms can be operated separately by virtue of severing the post 74 along the line 80 as is illustrated in FIG. 2. This could be readily carried out by cutting with a hacksaw or other instrument. Then both of the control arms 54 may be operated separately. This means that the hot water could be turned on and the cold water turned off or vice-versa.

It is furthermore noted that the construction of the present invention is also tamper proof particularly with respect to improper operation by children. In this regard it is noted that the control handle 22 is substantially recessed in the gap or recess 20 and thus does not extend out any substantial distance from the housing. This makes it more difficult to have access by a child to the handle structure. Also, this particular positional arrangement makes it more difficult for one to accidentally actuate the handle in either direction.

In accordance with a further feature of the present invention, it is noted that an accomodation is made, such as illustrated in FIGS. 1 and 3, to provide access to the packing screw 50. In this way the adjustment of this screw can be carried out without the need for disassembly of any parts.

Having now described a limited number of embodiments of the present invention, it should now be apparent to those skilled in the art that numerous other embodiments and modifications thereof are contemplated as falling within the scope of the present invention as defined by the appended claims.

What is claimed is:

1. A valve comprising:
  a valve comprising:
  a body having first and second support members separated by a gap,
  first and second liquid conduit means supported respectively in said first and second support members,
  first and second valve closure means each having open and closed positions and supported respectively in said first and second liquid conduit means,
  said first and second valve closure means each having actuating means directed in facing respective relationship, and
  handle means secured to and for operation of the actuating means of said first and second valve closure means, said handle means adapted to move at least partially through said gap between open and closed positions of said valve closure means,
  said actuating means includes packing means and means for adjusting the packing means
  said support means including recess means to enable access to said means for adjusting,
  said packing means including an O-ring,
  said means for adjusting including a screw that may be tightened to compress the O-ring.

2. A valve comprising, a body having first and second support members, a first and second liquid conduit means supported respectively in said first and second members, first and second valve closure means each having open and closed positions and supported respectively in said first and second liquid conduit means, said first and second valve closure means each having valve stem actuating means extending along a valve actuating axis, handle means secured to and for operation of the actuating means of said first and second valve closure means, said handle means including a common handle having separate control arms for securing to the respective actuating means, said common handle having a base end supporting the control arms and including an interlocking member, said control arms extending generally in a direction from said actuating means that is substantially orthogonal to said valve actuating axis, wherein said actuating means includes packing means comprising a packing ring and packing adjusting means including a screw that may be tightened to compress the packing ring.

3. A valve comprising, a body having first and second support members, a first and second liquid conduit means supported respectively in said first and second members, first and second valve closure means each having open and closed positions and supported respectively in said first and second liquid conduit means, said first and second valve closure means each having actuating means, handle means secured to and for operation of the actuating means of said first and second valve closure means, said handle means including a common handle having separate control arms for securing to the respective actuating means, said common handle having a base end supporting the control arms, said actuating means including packing means comprising a packing ring and packing adjusting means including a screw that may be tightened to compress the packing ring.

* * * * *